United States Patent
Ishida

(10) Patent No.: US 12,195,667 B2
(45) Date of Patent: Jan. 14, 2025

(54) BORON NITRIDE NANOMATERIAL AND RESIN COMPOSITION

(71) Applicant: SEKISUI CHEMICAL CO., LTD., Osaka (JP)

(72) Inventor: Hiroya Ishida, Kusatsu (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 882 days.

(21) Appl. No.: 17/286,642

(22) PCT Filed: Oct. 29, 2019

(86) PCT No.: PCT/JP2019/042318
§ 371 (c)(1),
(2) Date: Apr. 19, 2021

(87) PCT Pub. No.: WO2020/090796
PCT Pub. Date: May 7, 2020

(65) Prior Publication Data
US 2021/0371719 A1    Dec. 2, 2021

(30) Foreign Application Priority Data
Oct. 29, 2018   (JP) ................ 2018-202924

(51) Int. Cl.
| | |
|---|---|
| *C09K 5/14* | (2006.01) |
| *B82Y 30/00* | (2011.01) |
| *B82Y 40/00* | (2011.01) |
| *C01B 21/064* | (2006.01) |
| *C08K 3/38* | (2006.01) |
| *C08K 7/04* | (2006.01) |
| *C08K 7/24* | (2006.01) |

(52) U.S. Cl.
CPC ............ *C09K 5/14* (2013.01); *C01B 21/0641* (2013.01); *C01B 21/0648* (2013.01); *C08K 3/38* (2013.01); *C08K 7/04* (2013.01); *C08K 7/24* (2013.01); *B82Y 30/00* (2013.01); *B82Y 40/00* (2013.01); *C01P 2002/82* (2013.01); *C01P 2004/133* (2013.01); *C01P 2004/24* (2013.01); *C01P 2004/64* (2013.01); *C08K 2003/385* (2013.01); *C08K 2201/003* (2013.01); *C08K 2201/004* (2013.01); *C08K 2201/005* (2013.01); *C08K 2201/011* (2013.01)

(58) Field of Classification Search
CPC ....................................................... C08K 7/04
See application file for complete search history.

(56) References Cited

U.S. PATENT DOCUMENTS

| | | |
|---|---|---|
| 2011/0033707 A1 | 2/2011 | Tang et al. |
| 2018/0298263 A1 | 10/2018 | Ishida |

FOREIGN PATENT DOCUMENTS

| | | |
|---|---|---|
| CN | 103980664 | 8/2014 |
| CN | 107161961 | 9/2017 |
| CN | 107614619 | 1/2018 |
| CN | 107779153 | 3/2018 |
| CN | 108641371 | 10/2018 |
| EP | 3 378 899 | 9/2018 |
| JP | 2010-180066 | 8/2010 |
| JP | 2017052915 A * | 3/2017 |
| JP | 2017-132662 | 8/2017 |
| JP | 6212660 | 10/2017 |
| KP | 10-2017-0114903 | 10/2017 |
| TW | 201728665 | 8/2017 |
| WO | 2017/086226 | 5/2017 |

OTHER PUBLICATIONS

English machine translation of Morishita et al., JP 2017-052915A. (Year: 2017).*
Junlin Su et al., "Enhanced thermal conductivity in epoxy nanocomposites with hybrid boron nitride nanotubes and nanosheets", Physica Status Solidi, A: Applications and Materials Science, vol. 210, No. 12, Dec. 1, 2013, pp. 2699-2705.
International Search Report issued Dec. 3, 2019 in International (PCT) Application No. PCT/JP2019/042318.
Yan et al., "Enhanced thermal-mechanical properties of polymer composites with hybrid boron nitride nanofillers", Applied Physics. A, 2013, vol. 114, pp. 331-337.
Da Silva et al., "Synthesis of boron nitride nanostructures from catalyst of iron compounds via thermal chemical vapor deposition technique", Physica E, 2017, vol. 89, pp. 177-182.

* cited by examiner

*Primary Examiner* — Peter F Godenschwager
(74) *Attorney, Agent, or Firm* — Wenderoth, Lind & Ponack, L.L.P.

(57) ABSTRACT

The boron nitride nanomaterial of the present invention is a boron nitride nanomaterial comprising a boron nitride nanotube and a boron nitride nanosheet, and having a peak top of a Raman spectrum located at 1369 $cm^{-1}$ or more.

10 Claims, No Drawings

BORON NITRIDE NANOMATERIAL AND RESIN COMPOSITION

TECHNICAL FIELD

The present invention relates to, for example, a boron nitride nanomaterial for use in a heat radiation member, and a resin composition comprising a boron nitride nanomaterial.

BACKGROUND ART

Electronic equipment may be provided with heat radiation members for radiation of heat generated from electronic components to the outside of such equipment because electronic components integrated may generate heat to cause failures. Such a heat radiation member is disposed, for example, between such any electronic component and a housing or heatsink. Such a heat radiation member includes a composite material formed from a resin composition into which a heat-conductive filler is contained in a resin component such as a silicone resin or an epoxy resin.

In recent years, electronic equipment has been increasingly reduced in size and increased in performance, resulting in a tendency to generate increased heat therefrom, and there has been a demand for a further enhancement in heat radiation performance of the composite material. Thus, for example, PTL 1 has tried to enhance heat radiation properties with mechanical characteristics being improved by combination use of a boron nitride nanotube and an insulating filler other than a nanotube as a heat-conductive filler.

CITATION LIST

Patent Literature

PTL 1: JP 6212660 B

SUMMARY OF INVENTION

Technical Problem

Use of the boron nitride nanotube as in PTL 1 increases heat conductivity of the composite material to enhance heat radiation performance, but it may cause an increase in viscosity of the resin composition into which the boron nitride nanotube is contained, and may cause no improvement in workability.

An object of the present invention is then to provide a boron nitride nanomaterial which not only allows the viscosity of a resin composition in which the boron nitride nanomaterial is contained, to be kept low, but also can allow a composite material formed from the resin composition to be enhanced in heat conductivity.

Solution to Problem

The present inventor has made intensive studies, and as a result, has found that the above problems can be solved by using not only a boron nitride nanotube, but also a boron nitride nanosheet, as a boron nitride nanomaterial, and adjusting a Raman spectrum within a predetermined range, and thus has completed the following present invention. The present invention provides the following [1] to [10].

[1] A boron nitride nanomaterial comprising a boron nitride nanotube and a boron nitride nanosheet, and having a peak top of a Raman spectrum located at 1369 cm$^{-1}$ or more.

[2] The boron nitride nanomaterial according to [1], wherein the boron nitride nanotube comprises a multiwall tube.

[3] The boron nitride nanomaterial according to [2], wherein the multiwall tube has an average diameter of 4 nm or more and 50 nm or less and an average length of 100 nm or more and 50 µm or less.

[4] The boron nitride nanomaterial according to any one of [1] to [3], wherein the boron nitride nanosheet has an average thickness of less than 10 nm.

[5] The boron nitride nanomaterial according to any one of [1] to [4], wherein the boron nitride nanosheet comprises a boron nitride nanosheet having a thickness of 2 nm or less.

[6] The boron nitride nanomaterial according to any one of [1] to [5], further comprising a boron nitride nanoparticle.

[7] The boron nitride nanomaterial according to [6], wherein the boron nitride nanoparticle has a proportion of 50% by mass or more of a particle with a size of 50 nm or less.

[8] A resin composition comprising the boron nitride nanomaterial according to any one of [1] to [7], and a resin component.

[9] The resin composition according to [8], wherein a filling ratio of the boron nitride nanomaterial is 0.5% by volume or more and 40% by volume or less.

[10] The resin composition according to [8] or [9], further comprising any heat-conductive filler other than the boron nitride nanomaterial.

Advantageous Effects of Invention

The boron nitride nanomaterial of the present invention not only allows the viscosity of a resin composition in which the boron nitride nanomaterial is contained, to be kept low, but also can allow a composite material formed from the resin composition to be enhanced in heat conductivity.

DESCRIPTION OF EMBODIMENTS

Hereinafter, the present invention will be described with reference to embodiments.

[Boron Nitride Nanomaterial]

The boron nitride nanomaterial of the present invention comprises a boron nitride nanotube (hereinafter, also referred to as "BNNT") and a boron nitride nanosheet (hereinafter, also referred to as "BNNS"), wherein the peak top of a Raman spectrum is located at 1369 cm$^{-1}$ or more.

The boron nitride nanomaterial of the present invention comprises both BNNT and BNNS, wherein the peak top of a Raman spectrum is located at 1369 cm$^{-1}$ or more, and therefore the boron nitride nanomaterial not only allows the viscosity of a resin composition in which the boron nitride nanomaterial is contained, to be kept low, but also can allow a composite material formed from the resin composition to be enhanced in heat conductivity.

While hexagonal boron nitride allows heat propagation by lattice vibration, a common hexagonal boron nitride particle is formed of, for example, many boron nitride crystal layers of from several ten layers to several hundred layers, and thus exhibits the characteristics of scattering of lattice vibration between such layers. On the other hand, BNNT having a tube shape is known to exhibit high heat conduction due to less scattering of lattice vibration in heat propagation. BNNT is formed of one or more stacked boron nitride crystal layers, and exhibits higher heat conduction because less scattering of lattice vibration is made as the number of stacked layers is smaller. BNNS is formed of one boron nitride crystal layer or several to about ten such stacked layers, and is smaller in number of layers than common boron nitride and thus is suppressed in scattering of lattice vibration between layers to exhibit higher high heat conduction.

A common hexagonal boron nitride particle formed from multiple boron nitride layers exhibits a peak top of a Raman spectrum, derived from boron nitride, at about 1365 to 1368 $cm^{-1}$. Such a particle is made of about several boron nitride layers and thus is very thin, and therefore such a peak top of a Raman spectrum is shifted to a higher wavenumber. Thus, a peak top derived from boron nitride, located at 1369 $cm^{-1}$ or more, as in the present invention, means that the boron nitride nanomaterial comprises certain proportions or more of thin films of BNNT and BNNS, and it is considered that a composite material formed from the resin composition can be thus enhanced in heat conductivity.

BNNT, when compared with BNNS, has a tube shape and thus easily has a network structure in the form of a resin composition, and has the effect of increasing heat conduction of the resin composition and the composite material thereof, but causes the resin composition to be increased in viscosity due to, for example, tube entanglement or aggregation, resulting in deterioration in workability. On the other hand, BNNS, when compared with BNNT, is small in aggregation force and thus does not deteriorate the viscosity of the resin composition. An advantage is thus that a mixture of BNNT and BNNS does not increase the viscosity of the resin composition as compared with single BNNT. A peak top of a Raman spectrum derived from boron nitride, located at 1369 $cm^{-1}$ or more, as in the present invention, means that certain proportions or more of thin films of BNNT and BNNS are comprised, and it is considered that a composite material formed from the resin composition can be thus enhanced in heat conductivity.

Any boron nitride nanomaterial, which exhibits a peak top derived from boron nitride at less than 1369 $cm^{-1}$, causes a proportion of thin films of BNNT and BNNS comprised to be insufficient, namely, has a difficulty in allowing a composite material to be high in heat conductivity due to incorporation of any boron nitride particle made of multilayer boron nitride. Any boron nitride nanomaterial, which comprises neither BNNT nor BNNS, also has a difficulty in satisfying both a reduction in viscosity and an enhancement in heat conductivity, described above.

In the present invention, the peak top of a Raman spectrum of the boron nitride nanomaterial is preferably located at 1370 $cm^{-1}$ or more from the viewpoints of the viscosity of the resin composition and the heat conductivity of the composite material.

The peak top of a Raman spectrum of the boron nitride nanomaterial is not particularly limited, and is located at, for example, 1375 $cm^{-1}$ or less in terms of characteristics of the boron nitride nanomaterial. The peak top of a Raman spectrum of the boron nitride nanomaterial is more preferably located at 1370 $cm^{-1}$ or more and 1373 $cm^{-1}$ or less from the viewpoint that both viscosity and a high heat conductivity are satisfied.

The boron nitride nanomaterial of the present invention may further comprise a boron nitride nanoparticle (hereinafter, also referred to as "BNNP"), in addition to BNNT and BNNS. A certain number of BNNPs may be contained because BNNP is lower in aggregation force than BNNT and thus has the effect of reducing the viscosity of the resin composition, though it is lower in contribution to heat conduction in the resin composition due to its shape than BNNT and BNNS. In a case where the boron nitride nanomaterial, even if comprises BNNP, here exhibits a peak top of a Raman spectrum at 1369 $cm^{-1}$ or more, as described above, not only the viscosity of a resin composition into which the boron nitride nanomaterial is compounded is kept low, but also a composite material formed from the resin composition can be enhanced in heat conductivity.

BNNP is a particle in which boron nitride forms stacked layers in a layered manner and is particulate, and thus the peak top of a Raman spectrum, derived from boron nitride, is shifted to a higher wavenumber due to a reduction in number of boron nitride layers. Accordingly, the boron nitride nanomaterial, even if further comprises BNNP, can exhibit a peak top of a Raman spectrum at 1369 $cm^{-1}$ or more due to a reduction in particle size of BNNP and a reduction in number of boron nitride constituent layers.

The peak top of a Raman spectrum is read from a waveform observed at 1360 to 1380 $cm^{-1}$ in observation of a Raman spectrum of the boron nitride nanomaterial, as indicated in Examples described below.

(BNNT)

BNNT is a tubular material formed from boron nitride. An ideal structure of BNNT is any structure where a hexagonal network surface forms a tube so as to be in parallel with a tube axis to form a single tube or a multiple tube. BNNT is referred to as "single wall tube" when it is in the form of a single tube, and is referred to as "multiwall tube" when it is in the form of a multiple tube. Any of a single wall tube and a multiwall tube may be used as BNNT in the present invention, and a multiwall tube is preferably used. The reason for this is because use of a multiwall tube is effective for reducing tube entanglement and thus aggregation.

In a case where a multiwall tube is used, BNNT may be used in the form of a multiwall tube alone, or may be used in the form of a combination of a multiwall tube and a single wall tube.

The boron nitride nanotube has, for example, an average diameter of 2 nm or more and 50 nm or less and an average length of 100 nm or more and 50 μm or less. An average diameter in the range easily allow the peak top of a Raman spectrum of the boron nitride nanomaterial to be located at 1369 $cm^{-1}$ or more. An average diameter and an average length in the respective ranges not only improve the viscosity of a resin composition into which the boron nitride nanomaterial is compounded, but also easily enhance the heat conductivity of a composite material formed from the resin composition.

The average diameter of the boron nitride nanotube is preferably 3 nm or more, more preferably 4 nm or more from the viewpoint that a multiwall tube is contained in a certain amount or more and is easily enhanced in dispersing ability. The average diameter of the boron nitride nanotube is preferably 10 nm or less, more preferably 8 nm or less from the viewpoint that both a reduction in viscosity and an enhancement in heat conductivity are satisfied as described above.

The average length of the boron nitride nanotube is preferably 500 nm or more, more preferably 1 μm or more, and preferably 20 μm or less, more preferably 8 μm or less, further preferably 5 μm or less from the viewpoint that both a reduction in viscosity and an enhancement in heat conductivity are satisfied as described above.

The multiwall tube is relatively large in diameter, and or use in the present invention, for example, it has an average diameter of 4 nm or more and 50 nm or less and an average length of 100 nm or more and 50 μm or less. The average diameter of the multiwall tube is preferably 10 nm or less, more preferably 8 nm or less from the viewpoint that both a reduction in viscosity and an enhancement in heat conductivity are satisfied.

The average length of the multiwall tube is preferably 500 nm or more, more preferably 1 μm or more, and preferably 20 μm or less, more preferably 8 μm or less, further preferably 5 μm or less from the viewpoint that both a reduction in viscosity and an enhancement in heat conductivity are satisfied.

On the other hand, the single wall tube is relatively small in average diameter, and is, for example, one having an average diameter of 2 nm or more and 3 nm or less and an average length of 100 nm or more and 50 μm or less. The average diameter of the single wall tube is preferably 2.5 nm or less. The average length of the single wall tube is preferably 500 nm or more, more preferably 1 μm or more, and preferably 20 μm or less, more preferably 8 μm or less, further preferably 5 μm or less, from the viewpoint that both a reduction in viscosity and an enhancement in heat conductivity are satisfied in the resin composition.

The diameter of BNNT means the outer diameter in the case of the single wall tube, and means the outer diameter of a tube located outermost in the case of the multiwall tube. The diameter and the length of BNNT may be measured, for example, in an image obtained by TEM (transmission electron microscopy) observation, and the average diameter and the average length may be determined with the respective arithmetic averages with respect to any fifty tubes.

(BNNS)

BNNS is formed from boron nitride and has an ultrathin two-dimensional sheet structure, and has, for example, a structure where one or more hexagonal boron nitride layers are stacked.

BNNS for use in the present invention preferably has an average thickness of less than 10 nm. An average thickness of less than 10 nm easily imparts a peak top of a Raman spectrum of the boron nitride nanomaterial, located at 1369 cm$^{-1}$ or more, and not only the viscosity of a resin composition into which the boron nitride nanomaterial is compounded is kept low, but also the heat conductivity of a composite material formed from the resin composition can be enhanced. The average thickness of BNNS is more preferably 6 nm or less, further preferably 4 nm or less from such viewpoints. The lower limit of the average thickness of BNNS is not particularly limited, and is, for example, 1 nm.

BNNS preferably comprises a boron nitride nanosheet having a thickness of 2 nm or less. In a case where a boron nitride nanosheet of 2 nm or less is contained, a peak top of a Raman spectrum located at 1369 cm$^{-1}$ or more is easily exhibited, and both a resin composition with a reduced viscosity and a composite material with an enhanced heat conductivity are easily achieved.

The size of BNNS is not particularly limited, and has, for example, an average longest diameter of 200 nm or more and 3 μm or less, preferably 500 nm or more and 2 μm or less.

The thickness and the longest diameter of BNNS can be measured, for example, in an image obtained by TEM (transmission electron microscopy) observation, and the average thickness and the average longest diameter of BNNS may be each determined with the respective arithmetic average with respect to any fifty sheets in such an image observed by the electron microscopy.

(BNNP)

BNNP is not particularly limited, and is, for example, a hexagonal boron nitride particle whose particle size is nanosized (less than 1 μm). The shape of BNNP is not particularly limited, and is, for example, a spherical, polygonal, or indefinite shape.

In the boron nitride nanomaterial, the proportion of a particle having a size of 50 nm or less in BNNP is preferably 50% by mass or more, and the proportion is more preferably 55% by mass or more, further preferably 65% by mass or more. A higher proportion of such BNNP small in size allows the boron nitride nanomaterial to easily exhibit a peak top of a Raman spectrum at 1369 cm$^{-1}$ or more, and not only the resin composition has a reduced viscosity, but also the composite material easily has an enhanced heat conductivity. The proportion of a particle having a size of 50 nm or less in BNNP is more preferably higher, and the upper limit is 100% by mass.

The average particle size of BNNP is not particularly limited, and is, for example, 5 nm or more and 100 nm or less, preferably 10 nm or more and 50 nm or less.

The particle size of BNNP may be determined by, for example, measuring the maximum size of any particle in an image obtained by TEM (transmission electron microscopy) observation. The proportion of a particle having a size of 50 nm or less can be obtained by, for example, measuring the maximum size of each of any fifty particles. The average particle size may be determined as the arithmetic average of the maximum sizes of such any fifty particles.

(Content of Each Component)

The respective contents of BNNT, BNNS, and BNNP in the boron nitride nanomaterial of the present invention may be appropriately adjusted so that the peak top of a Raman spectrum is located at 1369 cm$^{-1}$ or more.

For example, the mass ratio (BNNS/BNNT) of the content of BNNS to the content of BNNT in the boron nitride nanomaterial is not particularly limited, and is, for example, 20/80 or more and 80/20 or less, preferably 30/70 or more and 70/30 or less, more preferably 40/60 or more and 60/40 or less from the viewpoints of, for example, a reduction in viscosity and an enhancement in heat conductivity, described above.

In a case where the boron nitride nanomaterial comprises BNNP, the mass ratio (BNNP/(BNNT+BNNS)) of the content of BNNP to the total amount of BNNT and BNNS is, for example, 1/99 or more and 50/50 or less, preferably 5/95 or more and 40/60 or less, more preferably 10/90 or more and 40/60 or less.

A specific content of BNNT is, for example, 20% by mass or more and 80% by mass or less, preferably 25% by mass or more and 75% by mass or less, more preferably 30% by mass or more and 70% by mass or less, and a specific content of BNNS is, for example, 20% by mass or more and 80% by mass or less, preferably 25% by mass or more and 75% by mass or less, more preferably 30% by mass or more and 70% by mass or less. A specific content of BNNP is, for example, 0% by mass or more and 50% by mass or less, preferably 0% by mass or more and 40% by mass or less, more preferably 0% by mass or more and 35% by mass or less. Such contents are each represented by "% by mass" based on the total amount of the boron nitride nanomaterial.

(Production Method)

The method for producing the boron nitride nanomaterial of the present invention is not particularly limited, and BNNT, BNNS, and BNNP may be separately synthesized, and mixed at any ratio. In such a case, the method for synthesizing BNNT is not particularly limited, and examples include a laser abrasion method, a plasma method, a CVD method, and a milling method. The method for synthesizing BNNS is not particularly limited, and examples include a method involving formation on a substrate such as copper according to a CVD method, and a method involving releasing hexagonal boron nitride having a multilayer structure according to ultrasonic waves or the like. The method for synthesizing BNNP is not particularly limited, and examples include a synthesis method according to a CVD method.

BNNT, BNNS, and BNNP each having the above sizes (diameter, length, and thickness) can be obtained by appropriately adjusting the production method.

BNNT is produced by, for example, heating a boron powder and a metal oxide such as magnesium oxide or iron oxide to generate vapor of boron oxide, according to a CVD method, reacting the vapor with ammonia gas, and thereafter purifying the resultant by washing, centrifugation, and/or the like. The diameter and length of BNNT can be here appropriately adjusted by appropriately adjusting, for example, the heating temperature, the size of a raw material such as iron oxide, and conditions of centrifugation.

The thickness, the longest diameter, and the like of BNNS can be adjusted by, for example, appropriately adjusting the conditions of ultrasonic waves, and the size of hexagonal boron nitride before application of ultrasonic waves, in the case of releasing by ultrasonic waves. BNNP is produced by, for example, growth on a substrate, and thereafter purifying the resultant by washing, centrifugation and the like in a CVD method, and the diameter of BNNP can be adjusted by appropriately adjusting the conditions of centrifugation and the like.

The methods for adjusting the respective sizes of BNNT, BNNS, and BNNP are, of course, not limited thereto, and any method may be adopted.

BNNT, BNNS, and BNNP are not required to be separately synthesized, and the boron nitride nanomaterial may also be synthesized by combining one selected from BNNT, BNNS, and BNNP with one or more other than the one selected.

For example, BNNS, or BNNS and BNNP may be intendedly incorporated as by-product(s) by, for example, adjustment of synthesis conditions of BNNT, and more specific examples include a method involving synthesizing also BNNS by opening of some BNNT tubes during the synthesis of BNNT.

At least any of BNNT, BNNS, and BNNP may be appropriately subjected to a surface treatment. The surface treatment may be made by attaching a surface treatment agent such as a coupling agent (for example, silane coupling agent) to a surface of at least one thereof. Such a surface may also be covered with any conjugated polymer such as a polyphenylene vinylene polymer, a polythiophene polymer, a polyphenylene polymer, a polypyrrole polymer, a polyaniline polymer, and a polyacetylene polymer.

[Resin Composition]

The boron nitride nanomaterial of the present invention is, for example, mixed with a resin and used in the form of a composite material. The resin composition for formation of the composite material in the present invention comprises the above boron nitride nanomaterial (namely, comprising at least the boron nitride nanotube and the boron nitride nanosheet), and a resin component. The resin composition can form, for example, a heat radiation member, as described below. The resin composition of the present invention comprises the above boron nitride nanomaterial, and thus not only is low in viscosity, but also enables a composite material formed from the resin composition to be high in heat conductivity.

As described above, the boron nitride nanomaterial contained in the resin composition exhibits a peak top of a Raman spectrum at 1369 $cm^{-1}$ or more, and the boron nitride nanomaterial may be separated from the resin composition and then subjected to measurement of a Raman spectrum and such separation can be made by, for example, the following method.

The boron nitride nanomaterial can be isolated by firing the resin composition in an oven at 600° C. for 3 hours, thereby completely vaporizing and removing an organic component, then transferring 100 mg of a residue to a glass container and adding 100 mL of N-methylpyrrolidone (NMP) thereto, for dispersion with stirring in an ultrasonic bath for 20 minutes, and subjecting a dispersion liquid to separation with a centrifuge at a rotational speed of 2000 rpm for 10 minutes, to recover and filter a supernatant portion.

The filling ratio of the boron nitride nanomaterial in the resin composition of the present invention is preferably 0.5% by volume or more and 40% by volume or less. The boron nitride nanomaterial can be added at a ratio of 0.5% by volume or more, thereby increasing the heat conductivity of the composite material. The ratio can be 40% by volume or less, thereby preventing the viscosity of the resin composition from being excessively higher. The filling ratio of the boron nitride nanomaterial is more preferably 4% by volume or more and 35% by volume or less, further preferably 10% by volume or more and 30% by volume or less from the viewpoints of sufficient enhancement of heat conductivity, and reduction of viscosity of the resin composition and an improvement in workability.

The "filling ratio" is herein represented by "% by volume" based on the total volume of the resin composition, and the filling ratio of the boron nitride nanomaterial is, for example, represented by "% by volume" of the boron nitride nanomaterial based on the total volume of the resin composition. The volume of each component can be calculated from the weight and the specific gravity at room temperature (23° C.) of each component.

(Resin Component)

The resin component for use in the resin composition of the present invention holds the boron nitride nanomaterial dispersed in the resin composition. The resin component is not particularly limited, and examples include a curable resin, a thermoplastic resin, and an elastomer resin. Examples of the curable resin include a silicone resin, an epoxy resin, a urethane resin, a phenol resin, an unsaturated polyester resin, a polyimide resin, and an oxetane resin. The curable resin may be any of moisture-curable, thermosetting, and photocurable resins, and is preferably a thermosetting resin.

Examples of the thermoplastic resin include polyolefin resins such as a polypropylene resin, a polyethylene resin, a poly(1-)butene resin, and a polypentene resin, polyester resins such as polyethylene terephthalate, and a polystyrene resin, an acrylonitrile-butadiene-styrene (ABS) resin, an ethylene-vinyl acetate copolymer (EVA), a (meth)acrylic resin, a polyamide resin and a polyvinyl chloride resin (PVC).

Examples of the elastomer resin include acrylonitrile-butadiene rubber, ethylene-propylene-diene rubber, ethylene-propylene rubber, natural rubber, polybutadiene rubber, and polyisoprene rubber. Such an elastomer resin may be a liquid elastomer in a liquid form or a solid at room temperature (23° C.) and ordinary pressure (1 atm), or may be a mixture thereof.

The elastomer resin here used can be a thermoplastic elastomer such as a polyester-based thermoplastic elastomer, a polyurethane-based thermoplastic elastomer, or a styrene-based thermoplastic elastomer.

The resin component may be a liquid resin component such as silicone oil or process oil. The liquid resin component is any component which is a liquid at room temperature and ordinary pressure when added, and which is a liquid or gel when used. That is, the liquid resin component is any component which is a polymer component not to be cured by a curing agent or the like or which is a polymer component to be cured and is in the form of a liquid or gel even after curing. Accordingly, in a case where the liquid resin component is used singly or at a relatively high compounding ratio, a composite material formed from the resin composition can be in the form of a paste.

Such a resin component may be used singly or in combinations of two or more kinds thereof.

Examples of the above silicone oil include methylphenylsilicone oil, dimethylsilicone oil, and modified silicone oil. The silicone oil preferably has, for example, a viscosity at 25° C. of 1000 mPa·s or less, and preferably 50 mPa·s or more, more preferably 500 mPa·s or more and 900 mPa·s or less, further preferably 600 mPa·s or more and 700 mPa·s or less.

The viscosity herein refers to any viscosity measured at a rotational speed of 5 rpm and a measurement temperature of 25° C. with a rotor having a diameter (φ) of 48 mm in a B type viscometer, and specific measurement may be performed according to a method described in Examples.

The resin component is preferably any curable resin described above, more preferably any thermosetting resin described above. Such a curable resin is generally a resin component to be cured by curing a base resin with a curing agent, and the base resin may be a polymer component or a monomer component. In such a case, the resin component is formed of the base resin and the curing agent.

The curable resin is preferably a silicone resin or an epoxy resin, more preferably a silicone resin. Such a silicone resin as the curable resin is preferably a condensation curable silicone resin or an addition reaction curable silicone resin, more preferably an addition reaction curable silicone resin.

The addition reaction curable silicone resin preferably includes a silicone compound serving as the base resin, and a curing agent for curing the base resin. The silicone compound for use as the base resin is preferably any alkenyl group-containing organopolysiloxane. Examples of the alkenyl group include those having 2 to 6 carbon atoms, such as a vinyl group, an allyl group, a 1-butenyl group, and a 1-hexenyl group, and a vinyl group is preferable in terms of ease of synthesis and the cost. The silicone compound for use as the base resin may have one or more alkenyl groups, and generally has two or more alkenyl groups.

Specific examples of the alkenyl group-containing organopolysiloxane include vinyl both-terminated organopolysiloxanes such as vinyl both-terminated polydimethylsiloxane, vinyl both-terminated polyphenylmethylsiloxane, a vinyl both-terminated dimethylsiloxane-diphenylsiloxane copolymer, a vinyl both-terminated dimethylsiloxane-phenylmethylsiloxane copolymer, and a vinyl both-terminated dimethylsiloxane-diethylsiloxane copolymer.

The silicone compound for use as the base resin may be, for example, any silicone compound having a viscosity at 25° C. of 1000 mPa·s or less, preferably 50 mPa·s or more, more preferably 500 mPa·s or more and 900 mPa·s or less, further preferably 600 mPa·s or more and 700 mPa·s or less.

The curing agent for use in the addition reaction curable silicone resin is not particularly limited as long as it can cure the silicone compound serving as the above base resin, and is preferably organohydrogen polysiloxane which is organopolysiloxane having two or more hydrosilyl groups (Sill).

Examples of the organohydrogen polysiloxane include a methylhydrosiloxane-dimethylsiloxane copolymer, polymethylhydrosiloxane, polyethylhydrosiloxane, and a methylhydrosiloxane-phenylmethylsiloxane copolymer. Such organohydrogen polysiloxane optionally contains a hydrosilyl group at any end.

The curing agent preferably has a viscosity at 25° C. of 1000 mPa·s or less, preferably 50 mPa·s or more, more preferably 500 mPa·s or more and 900 mPa·s or less, further preferably 600 mPa·s or more and 700 mPa·s or less.

When the respective viscosity ranges of the base resin and the curing agent described above are within the above ranges, it enables the viscosity of the resin composition to be lower, resulting in favorable workability. This also allows the boron nitride nanomaterial and other heat-conductive filler to be properly dispersed and then easily compounded into the resin composition in large amounts.

When the above curable silicone resin is used, a curing catalyst is usually compounded into the resin composition. Examples of the curing catalyst include a platinum-based catalyst, a palladium-based catalyst, and a rhodium-based catalyst, and in particular, a platinum-based catalyst is preferable. The curing catalyst is a catalyst for curing the silicone compound serving as a raw material of the silicone resin, and the curing agent. The amount of the curing catalyst added is usually 0.1 to 200 ppm, preferably 0.5 to 100 ppm based on the total mass of the silicone compound and the curing agent.

The epoxy resin here used may be any epoxy compound having at least one epoxy group, preferably two or more epoxy groups. Examples of the epoxy compound include bisphenol-type, novolac-type, naphthalene-type, triphenolalkane-type, biphenyl-type, and alicyclic epoxy compounds, and halides thereof and hydrogenated products thereof.

Such an epoxy resin may be used in the form of an epoxy compound singly, and is generally used in the form of one where such an epoxy compound serves as the base resin and a curing agent is further added thereto. The curing agent here used is a polyaddition-type or catalyst-type curing agent. Examples of the polyaddition-type curing agent include a polyamine-based curing agent, an acid anhydride-based curing agent, a polyphenol-based curing agent, polymercaptan, and dicyandiamide. Examples of the catalyst-type curing agent include tertiary amine, imidazoles, and a Lewis acid complex. Such an agent may be used singly or in combinations of two or more kinds thereof.

The thermosetting resin may be either one-part curable or two-part curable. Such a two-part curable thermosetting resin may be obtained by mixing the part one comprising the above base resin and the part two comprising the curing agent to thereby prepare a resin composition. In the case of the two-part thermosetting resin, the boron nitride nanomaterial may be compounded into any one of the part one and the part two, or may be compounded into both of the parts. Much the same is true on any other heat-conductive filler described below.

The filling ratio of the resin component in the resin composition is, for example, 5% by volume or more and 95% by volume or less, preferably 10% by volume or more and 90% by volume or less, more preferably 15% by volume or more and 85% by volume or less based on the total amount of the resin composition. In a case where the volume ratio of the resin component is equal to or more than the lower limit, the boron nitride nanomaterial and other heat-conductive filler dispersed in the resin component can be more held in the resin component, and a composite material formed from the resin composition can be kept to have a certain shape. The resin composition can also be prevented from being excessively increased in viscosity. In a case where the volume ratio is equal to or less than the upper limit value, the boron nitride nanomaterial and other heat-conductive filler can be compounded in respective certain amounts or more into the resin composition, and heat conductivity can be enhanced.

(Other Heat-Conductive Filler)

The resin composition of the present invention may further comprise any heat-conductive filler (hereinafter, also referred to as "other heat-conductive filler") other than the above boron nitride nanomaterial, as the heat-conductive filler. Another heat-conductive filler can be comprised to thereby allow the boron nitride nanomaterial to be incorporated between particles of another heat-conductive filler, and allow heat conductive properties to be further enhanced by the effect of bridging.

Another heat-conductive filler is preferably an insulating filler low in electric conductivity, and may be specifically a filler having a volume resistivity of $10^6 \Omega \cdot cm$ or more. Such an insulating filler can be used as another heat-conductive filler, thereby hardly causing any abnormal operation to occur, even when a composite material formed from the resin composition is used in electric equipment.

Examples of another heat-conductive filler include carbide, nitride, oxide, hydroxide, metal carbonate, and a carbon-based material.

Examples of the carbide include silicon carbide, boron carbide, aluminum carbide, titanium carbide, and tungsten carbide. Examples of the nitride include silicon nitride, aluminum nitride, gallium nitride, chromium nitride, tungsten nitride, magnesium nitride, molybdenum nitride, lithium nitride, and boron nitride. Such boron nitride is one where all the diameter, the thickness, the length, and the like are in the order of micrometers (namely, all the particle size, the thickness, the length, and the like are 1 μm or more), and is any boron nitride other than the boron nitride nanomaterial.

Examples of the oxide include iron oxide, zinc oxide, silicon oxide (silica), aluminum oxide such as alumina and boehmite, magnesium oxide, titanium oxide, cerium oxide, and zirconium oxide. Examples of the hydroxide include aluminum hydroxide, calcium hydroxide, and magnesium hydroxide. Examples of the metal carbonate include synthetic magnesite and magnesium carbonate. Examples of the carbon-based material include a diamond particle, carbon black, graphite, graphene, fullerene, a carbon nanotube, and a carbon nanofiber. For example, talc can also be used which is a silicate mineral.

Another heat-conductive filler may be used singly or in combinations of two or more kinds thereof.

Another heat-conductive filler preferably has a heat conductivity of 8 W/m·K or more, more preferably 15 W/m·K or more, further preferably 20 W/m·K or more from the viewpoint of enhancements in heat conductive properties. The upper limit of the heat conductivity of another heat-conductive filler is not particularly limited, and is, for example, 3000 W/m·K and may be 1000 W/m·K.

Another heat-conductive filler is preferably aluminum oxide such as alumina, magnesium oxide, synthetic magnesite, aluminum nitride, silicon nitride, silicon carbide, zinc oxide, diamond, or boron nitride, more preferably aluminum oxide, from the viewpoints of heat conductive properties and insulating properties. Another filler may be used singly or in combinations of two or more kinds thereof.

Another heat-conductive filler may be subjected to a surface treatment. Another heat-conductive filler, which is subjected to a surface treatment, is easily compatible with the resin component, and is easily dispersed uniformly in the resin component, together with the boron nitride nanomaterial.

Another heat-conductive filler is subjected to a surface treatment with a surface treatment agent such as a silane compound, an organotitanium compound, an organoaluminum compound, or a phosphate compound, preferably a surface treatment with a silane compound. Examples of the silane compound include a known silane coupling agent.

The shape of another heat-conductive filler is not particularly limited, and may be any of, for example, plate-like, scale-like, needle-like, fibrous, tubular, spherical, ground, and indefinite shapes.

The average particle size of another heat-conductive filler is preferably 0.5 μm or more and 200 μm or less, more preferably 5 μm or more and 100 μm or less. An average particle size in such a range easily enhances heat conductive properties of the composite material without any excess increase in viscosity of the resin composition. An average particle size equal to or less than the upper limit value does not cause any failures such as no uniform dispersion of another heat-conductive filler, even in high filling with such a filler.

The average particle size means the particle size (D50) at a cumulative volume of 50% in a particle size distribution determined according to a laser diffraction/scattering method.

The filling ratio of another heat-conductive filler in the resin composition is preferably 90% by volume or less, more preferably 80% by volume or less, further preferably 75% by volume or less. A filling ratio equal to or less than the upper limit value enables certain amounts or more of the resin component and the boron nitride nanomaterial to be compounded into the resin composition, thereby not only enhancing heat conductive properties, but also allowing the boron nitride nanomaterial to be more suitably held in the resin component. In a case where another heat-conductive filler is contained, the filling ratio therewith is not particularly limited, and is preferably 10% by volume or more, more preferably 20% by volume or more, further preferably 30% by volume or more in order to allow the effect of another heat-conductive filler added to be exerted.

(Other Additives)

The resin composition of the present invention may comprise, if necessary, any additives commonly used in a resin composition for a heat radiation member, such as a dispersant, a chelating agent, an antioxidant, a heat stabilizer, a colorant, a fire retardant, and an antistatic agent. When a thermosetting resin is used in the resin composition, a reaction retardant may be contained.

The resin composition of the present invention may comprise a solvent and may be diluted with a solvent. It is noted that, in a case of dilution with a solvent, the filling ratio of each of the components is calculated excluding the solvent.

The viscosity at 25° C. of the resin composition of the present invention is not particularly limited, and is preferably 1000 mPa·s or less, more preferably 900 mPa·s or less, further preferably 700 mPa·s or less. In a case where the viscosity of the resin composition is equal to or less than the upper limit value, workability in formation of a heat radiation member or the like from the resin composition is improved. The lower limit value of the viscosity at 25° C. of the resin composition is not particularly limited, and is, for example, 50 mPa·s.

(Preparation of Resin Composition)

The resin composition of the present invention may be prepared by mixing the boron nitride nanomaterial and the resin component, and another heat-conductive filler, an additive and the like to be, if necessary, compounded. The method for mixing these components is not particularly limited, and the resin composition may be prepared by, for example, adding to the resin component, the boron nitride nanomaterial, and another heat-conductive filler, an additive and the like to be, if necessary, compounded, and thereafter stirring or kneading the resultant. In preparation of the resin composition, the boron nitride nanomaterial obtained by mixing BNNT and BNNS, or BNNT, BNNS, and BNNP in advance may be added to the resin component, or BNNT and BNNS, or BNNT, BNNS, and BNNP may be each separately added to the resin component.

In the case of a two-part curable resin, the resin may be prepared by mixing the part one and the part two provided in advance, as described above. When the part one and the part two are each provided, they may be prepared in a similar manner by mixing various components included in the part one or the part two.

In the present invention, a composite material comprising a resin and the boron nitride nanomaterial is formed from the resin composition, as described above. Such a composite material is formed into a predetermined shape by, for example, processing the resin composition into a predetermined shape and appropriately curing the resultant by heating or the like, in a case where the resin component comprises a curable resin. The resin composition may be formed into any of film-like, layered, sheet-like, block-like, and indefinite shapes by, for example, coating, casting, potting, or extrusion.

In a case where the resin component comprises a curable resin, the resin composition may be cured by heating, light irradiation, or standing in the presence of moisture, depending on the type of the curable resin. When the curable resin is a two-part thermosetting resin, the part one and the part two may be mixed and cured. Also in a case where the resin component comprises no curable resin, the resin composition may be processed into a predetermined shape and then used.

The composite material of the present invention may be used in, for example, electric equipment. The composite material of the present invention has high heat conductive properties, and thus can be used as a heat radiation member in electric equipment. More specifically, a heat radiation member is disposed on an electronic component and is used for radiation of heat generated in the electronic component.

The composite material of the present invention may be disposed so as to be embedded in a gap between two opposite members, and thus used. One of such two opposite members may be, for example, an electronic component, and other thereof may be any of a heatsink to which heat from an electronic component is to be transferred, a housing for electronic equipment, a substrate, and the like.

The heat radiation member in the present invention may be used as a part of a substrate, for example, may be formed in a layered manner on a metal base plate of aluminum, copper, or the like. In such a case, a conductive layer such as a lead frame may be attached onto the composite material.

EXAMPLES

Hereinafter, Examples of the present invention will be described, but the present invention is not limited to the following Examples.

The measurement methods and the evaluation methods in the present invention are as follows.

<Raman Spectrum>

A Raman spectrum of the resulting boron nitride nanomaterial was measured. Such a Raman spectrum was obtained by performing wavenumber calibration with a microscopic Raman spectrometer (trade name "Almega" manufactured by Thermo Fisher Scientific K. K.) and then measurement under the conditions of a laser wavelength of 532 nm, an output of 100%, an object lens magnification of 100 times, a pinhole aperture of 100 μm, an exposure time of 1 second, a cumulative number of 32, and a measurement range from 4230 to 78 $cm^{-1}$. The peak top value of a waveform observed at 1360 to 1380 $cm^{-1}$ was read.

<Specific Heat Conduction>

A release treated surface of a PET sheet whose surface was release treated was coated with the resulting resin composition, and heated in an oven at 90° C. for 10 minutes, thereby providing a laminate sheet where a resin composition layer having a thickness of 200 μm was formed on one surface of the PET sheet. The release PET sheet was released from the resulting laminate sheet, furthermore the resin composition layer was sandwiched between copper foil and an aluminum plate, and the resultant was subjected to vacuum press forming under the conditions of a temperature of 140° C. and a pressure of 4 MPa, thereby providing a laminate having a laminated structure of copper foil/resin composition layer/aluminum plate. After the laminate was cut to 10 mm×10 mm, carbon black was sprayed onto both surfaces of the laminate cut, thereby producing a measurement sample. The heat conductivity of the resulting measurement sample was measured with a laser flash method, and evaluated according to the following criteria. The heat conductivity was obtained by preparing three of such laminates, cutting each of such laminates at three points to thereby provide nine measurement samples in total, and measuring the heat conductivity with respect to each of the measurement samples to thereby determine the average value.

AA: the heat conductivity was 3 times or more that of Comparative Example 1.
  A: the heat conductivity was 1.5 times or more and less than 3 times that of Comparative Example 1.
  B: the heat conductivity was 0.9 times or more and less than 1.5 times that of Comparative Example 1.
  C: the heat conductivity was 0.8 times or more and less than 0.9 times that of Comparative Example 1.
  D: the heat conductivity was 0.6 times or more and less than 0.8 time that of Comparative Example 1.
  DD: the heat conductivity was less than 0.6 times that of Comparative Example 1.

<Viscosity>

The viscosity corresponded to a viscosity (mPa·s) measured at a rotational speed of 5 rpm with a B type viscometer ("VISCOMETER TV-22", manufactured by Toki Sangyo Co., Ltd, rotor used: φ48 mm, set temperature: 25° C.). The viscosity of each of the resulting resin compositions in the present Examples and Comparative Examples was measured, and evaluated according to the following evaluation criteria.

A: 700 mPa·s or less
  B: more than 700 mPa·s and 900 mPa·s or less.

C: more than 900 Pa·s and 1000 mPa·s or less.
D: more than 1000 mPa·s.

[Preparation of Boron Nitride Nanomaterial]

(BNNT (A))

A crucible made of boron nitride was charged with boron, magnesium oxide, and iron oxide having an average particle size of 50 nm at a molar ratio of 2:2:1, and the crucible was heated to 1500° C. in a high frequency induction heating furnace (heating step 1). Ammonia gas was introduced into a product obtained in heating step 1, and the resultant was heated at 1400° C. for 5 hours (heating step 2).

The resulting white solid was washed with concentrated hydrochloric acid and washed with ion-exchange water until neutrality was achieved, and thereafter subjected to centrifugation at a rotational speed of 600 rpm for 10 minutes, and the supernatant was collected. The resulting liquid was filtered and dried, thereby providing BNNT (A) as a boron nitride nanotube. The resulting BNNT (A) had an average diameter of 5 nm and an average length of 2 μm, and included a multiwall tube.

(BNNT (B))

A crucible made of boron nitride was charged with boron, magnesium oxide, and iron oxide having an average particle size of 10 nm at a molar ratio of 2:1:1.5, and the crucible was heated to 1300° C. in a high frequency induction heating furnace (heating step 1). Ammonia gas was introduced into a product obtained in heating step 1, and the resultant was heated at 1350° C. for 3 hours (heating step 2).

The resulting white solid was washed with concentrated hydrochloric acid and washed with ion-exchange water until neutrality was achieved, and thereafter subjected to centrifugation at a rotational speed of 3000 rpm for 60 minutes, and the supernatant was collected. The resulting liquid was filtered and dried, thereby providing BNNT (B) as a boron nitride nanotube. The resulting BNNT had an average diameter of 2 nm and an average length of 2 μm, and included a single wall tube.

(BNNS (A))

Boron nitride having a longest diameter of 1 μm was dispersed in an aqueous 5 M sodium hydroxide solution by ultrasonic waves of 20 kHz for 72 hours. A dispersion liquid was subjected to centrifugation at a rotational speed of 3000 rpm for 60 minutes, and the supernatant was collected. The resulting liquid was filtered and dried, thereby providing BNNS (A) as a boron nitride nanosheet. The resulting BNNS had an average thickness of 2 nm and an average longest diameter of 1 μm.

(BNNS (B))

Boron nitride having a longest diameter of 1 μm was dispersed in an aqueous 5 M sodium hydroxide solution by ultrasonic waves of 20 kHz for 24 hours. A dispersion liquid was subjected to centrifugation at a rotational speed of 2000 rpm for 20 minutes, and the supernatant was collected. The resulting liquid was filtered and dried, thereby providing BNNS (B) as a boron nitride nanosheet. The resulting BNNS had an average thickness of 10 nm and an average longest diameter of 1 μm.

(BNNP (A))

Ammonia borane was heated and vaporized in a low-temperature furnace at 700° C., and a vaporized product was transported with a nitriding carrier gas to a high-temperature furnace, and heated at 1350° C. A powder produced on a sapphire substrate disposed in the high-temperature furnace was washed with 30% by mass nitric acid, and washed with ion-exchange water until neutrality was achieved. Next, the resultant was subjected to centrifugation at a rotational speed of 10000 rpm for 60 minutes, and the supernatant was collected. The resulting liquid was filtered and dried, thereby providing BNNP (A) as a boron nitride nanoparticle. The resulting BNNP (A) was occupied by 70% by mass of a particle having a size of 50 nm or less, and had an average particle size of 45 nm.

(BNNP (B))

Ammonia borane was heated and vaporized in a low-temperature furnace at 700° C., and a vaporized product was transported with a nitriding carrier gas to a high-temperature furnace, and heated at 1350° C. A powder produced on a sapphire substrate disposed in the high-temperature furnace was washed with 30% by mass nitric acid, and washed with ion-exchange water until neutrality was achieved. The resultant was subjected to centrifugation at a rotational speed of 9000 rpm for 30 minutes, and the supernatant was collected. The resulting liquid was filtered and dried, thereby providing BNNP (B) as a boron nitride nanoparticle. The resulting BNNP was occupied by 60% by mass of a particle having a size of 50 nm or less, and had an average particle size of 55 nm.

(BNNP (C))

Ammonia borane was heated and vaporized in a low-temperature furnace at 700° C., and a vaporized product was transported with a nitriding carrier gas to a high-temperature furnace, and heated at 1350° C. A powder produced on a sapphire substrate disposed in the high-temperature furnace was washed with 30% by mass nitric acid, and washed with ion-exchange water until neutrality was achieved. Next, the resultant was subjected to centrifugation at a rotational speed of 5000 rpm for 20 minutes, and the supernatant was collected. The resulting liquid was filtered and dried, thereby providing BNNP (C) as a boron nitride nanoparticle. The resulting BNNP (C) was occupied by 30% by mass of a particle having a size of 50 nm or less, and had an average particle size of 80 nm.

Example 1

First, BNNT (A) and BNNS (A) were mixed at a mass ratio of 1:1, thereby providing a boron nitride nanomaterial.

Next, 8 parts by mass of the boron nitride nanomaterial was added to 2 parts by mass of vinyl both-terminated organopolysiloxane (viscosity at 25° C.: 300 mPa·s) that forms a base resin of an addition reaction curable silicone resin, as a resin component, and 0.01 parts by mass of reaction retardant and a catalytic amount of a platinum catalyst were added thereto, thereby preparing a part one of a resin composition. 8 parts by mass of the boron nitride nanomaterial was added to 2 parts by mass of organohydrogen polysiloxane (viscosity at 25° C.: 400 mPa·s) that forms a curing agent of the addition reaction curable silicone resin, thereby preparing a-part two of the resin composition.

The part one and the part two were mixed at a mass ratio (part one/part two) of 1:1, thereby producing a resin composition, and the resin composition was evaluated. The results are shown in Table 1. The filling ratio of the boron nitride nanomaterial and the filling ratio of the resin component in the resin composition were 20% by volume and 80% by volume, respectively.

Example 2

The same procedure as in Example 1 was performed except that a boron nitride nanomaterial was obtained by mixing BNNT (A) and BNNS (A) at a mass ratio of 1:3.

Example 3

The same procedure as in Example 1 was performed except that a boron nitride nanomaterial was obtained by mixing BNNT (A), BNNS (A), and BNNP (A) at a mass ratio of 1:1:1.

Example 4

The same procedure as in Example 1 was performed except that the amount of the boron nitride nanomaterial in the part one was changed to 2 parts by mass and the amount of the boron nitride nanomaterial in the part two was changed to 2 parts by mass. The filling ratio of the boron nitride nanomaterial and the filling ratio of the resin component in the resin composition were 5% by volume and 95% by volume, respectively.

Example 5

30 parts by mass of dicyandiamide (manufactured by Tokyo Chemical Industry Co., Ltd.) as a thermosetting agent and 1 part by mass of a dispersant (trade name "KBM403", manufactured by Shin-Etsu Chemical Co., Ltd.) were added to 100 parts by mass of an epoxy resin (trade name "Epicoat 828US", manufactured by Mitsubishi Chemical Corporation) as a resin component, thereby preparing a resin mixture. A boron nitride nanomaterial produced in the same manner as in Example 1 was added to 54.2 parts by mass of the resin mixture, and the resultant was stirred with a planetary stirrer at 25° C. for 5 minutes, thereby providing a resin composition. The evaluation results of the resin composition are shown in Table 1. The filling ratio of the boron nitride nanomaterial and the filling ratio of the resin component in the resin composition were 20% by volume and 80% by volume, respectively.

Example 6

The same procedure as in Example 1 was performed except that not only the amount of the boron nitride nanomaterial in the part one was changed to 0.5 parts by mass and furthermore 71.8 parts by mass of an alumina particle was compounded, but also the amount of the boron nitride nanomaterial in the part two was changed to 0.2 parts by mass and furthermore 20 parts by mass of an alumina particle was compounded. The filling ratio of the boron nitride nanomaterial, the filling ratio of the alumina particle, and the filling ratio of the resin component in the resin composition were 1% by volume, 75% by volume, and 24% by volume, respectively. The alumina particle used was one having an average particle size 9 μm, trade name "AS50" (manufactured by Showa Denko K. K.).

Comparative Examples 1 to 5

The same procedure as in Example 1 was performed except that any of BNNT, BNNS, and BNNP was used singly as a boron nitride nanomaterial, as shown in Table 1.

Comparative Examples 6 to 8

The same procedure as in Example 1 was performed except that the boron nitride nanomaterial was changed to one obtained by mixing as shown in Table 1.

Comparative Example 9

The same procedure as in Example 5 was performed except that the boron nitride nanomaterial was changed to one obtained by mixing as shown in Table 1.

TABLE 1

| | | | | | | | | | Proportion (% by mass) of particle with a size of 50 |
|---|---|---|---|---|---|---|---|---|---|
| | | Type | | Mass ratio of BNNT:BNNS:BNNP | Type of BNNT | Diameter of BNNT | Length of BNNT | Thickness of BNNS | nm or less in BNNP |
| Example 1 | BNNT(A) | BNNS(A) | — | 1:1:0 | MW | 5 nm | 2 μm | 2 nm | — |
| Example 2 | BNNT(A) | BNNS(A) | — | 1:3:0 | MW | 5 nm | 2 μm | 2 nm | — |
| Example 3 | BNNT(A) | BNNS(A) | BNNP(A) | 1:1:1 | MW | 5 nm | 2 μm | 2 nm | 70% |
| Example 4 | BNNT(A) | BNNS(A) | BNNP(A) | 1:1:1 | MW | 5 nm | 2 μm | 2 nm | 70% |
| Example 5 | BNNT(A) | BNNS(A) | BNNP(A) | 1:1:1 | MW | 5 nm | 2 μm | 2 nm | 70% |
| Example 6 | BNNT(A) | BNNS(A) | BNNP(A) | 1:1:1 | MW | 5 nm | 2 μm | 2 nm | 70% |
| Comparative Example 1 | BNNT(B) | — | — | 1:0:0 | SW | 2 nm | 2 μm | — | — |
| Comparative Example 2 | BNNT(A) | — | — | 1:0:0 | MW | 5 nm | 2 μm | — | — |
| Comparative Example 3 | | BNNS(A) | — | 0:1:0 | — | — | — | 2 nm | — |
| Comparative Example 4 | | BNNS(B) | — | 0:1:0 | — | — | — | 10 nm | — |
| Comparative Example 5 | | — | BNNP(B) | 0:0:1 | — | — | — | — | 60% |
| Comparative Example 6 | BNNT(A) | BNNS(B) | — | 1:1:0 | MW | 5 nm | 2 μm | 10 nm | — |
| Comparative Example 7 | BNNT(A) | — | BNNP(C) | 1:0:1 | MW | 5 nm | 2 μm | — | 30% |
| Comparative Example 8 | BNNT(A) | BNNS(B) | BNNP(B) | 1:1:1 | MW | 5 nm | 2 μm | 10 nm | 60% |
| Comparative Example 9 | BNNT(A) | BNNS(B) | BNNP(B) | 1:1:1 | MW | 5 nm | 2 μm | 10 nm | 60% |

TABLE 1-continued

|  | | Boron nitride nanomaterial | | Another heat-conductive filler | | | Evaluation | |
|---|---|---|---|---|---|---|---|---|
|  | | Raman peak (cm$^{-1}$) | Filling ratio (% by volume) | Type | Filling ratio (% by volume) | Resin Type | Specific heat conduction | Viscosity |
| Example 1 | | 1370 | 20 | None | — | Silicone | A | B |
| Example 2 | | 1372 | 20 | None | — | Silicone | A | B |
| Example 3 | | 1370 | 20 | None | — | Silicone | A | B |
| Example 4 | | 1370 | 5 | None | — | Silicone | B | A |
| Example 5 | | 1370 | 20 | None | — | Epoxy | A | B |
| Example 6 | | 1370 | 1 | Alumina | 75 | Silicone | AA | B |
| Comparative Example 1 | | 1373 | 20 | None | — | Silicone | B | D |
| Comparative Example 2 | | 1368 | 20 | None | — | Silicone | B | D |
| Comparative Example 3 | | 1373 | 20 | None | — | Silicone | C | B |
| Comparative Example 4 | | 1368 | 20 | None | — | Silicone | D | B |
| Comparative Example 5 | | 1368 | 20 | None | — | Silicone | DD | B |
| Comparative Example 6 | | 1368 | 20 | None | — | Silicone | C | B |
| Comparative Example 7 | | 1368 | 20 | None | — | Silicone | C | C |
| Comparative Example 8 | | 1368 | 20 | None | — | Silicone | C | B |
| Comparative Example 9 | | 1368 | 20 | None | — | Epoxy | C | B |

*MW: multiwall tube; SW: single wall tube.

As shown in Table 1, each of Examples, in which the boron nitride nanomaterial comprised BNNT and BNNS and the peak top of a Raman spectrum was located at 1369 cm$^{-1}$ or more, thus not only allowed the viscosity of the resin composition to be kept low, but also could allow the composite material formed from the resin composition to have an enhanced heat conductivity.

On the contrary, each of Comparative Examples, in which the boron nitride nanomaterial did not comprise one or both of BNNT and BNNS or the peak top of a Raman spectrum was located at less than 1369 cm$^{-1}$, thus could not allow both a reduced viscosity of the resin composition and an enhanced heat conductivity of the composite material to be satisfied.

The invention claimed is:

1. A boron nitride nanomaterial comprising, a boron nitride nanotube having an average diameter of 3 nm or more and 10 nm or less and a boron nitride nanosheet, and having a peak top of a Raman spectrum located at 1369 cm$^{-1}$ or more.

2. The boron nitride nanomaterial according to claim 1, wherein the boron nitride nanotube comprises a multiwall tube.

3. The boron nitride nanomaterial according to claim 2, wherein the multiwall tube has an average diameter of 4 nm or more and 10 nm or less and an average length of 100 nm or more and 50 μm or less.

4. The boron nitride nanomaterial according to claim 1, wherein the boron nitride nanosheet has an average thickness of less than 10 nm.

5. The boron nitride nanomaterial according to claim 1, wherein the boron nitride nanosheet comprises a boron nitride nanosheet having a thickness of 2 nm or less.

6. The boron nitride nanomaterial according to claim 1, further comprising a boron nitride nanoparticle.

7. The boron nitride nanomaterial according to claim 6, wherein the boron nitride nanoparticle has a proportion of 50% by mass or more of a particle with a size of 50 nm or less.

8. A resin composition comprising:
the boron nitride nanomaterial according to claim 1; and
a resin component.

9. The resin composition according to claim 8, wherein a filling ratio of the boron nitride nanomaterial is 0.5% by volume or more and 40% by volume or less.

10. The resin composition according to claim 8, further comprising any heat-conductive filler other than the boron nitride nanomaterial.

* * * * *